United States Patent
Sanders et al.

(10) Patent No.: US 8,731,714 B2
(45) Date of Patent: May 20, 2014

(54) CONCURRENT PATH PLANNING WITH ONE OR MORE HUMANOID ROBOTS

(75) Inventors: Adam M. Sanders, Holly, MI (US);
Matthew J. Reiland, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 709 days.

(21) Appl. No.: 12/887,972

(22) Filed: Sep. 22, 2010

(65) Prior Publication Data

US 2012/0072019 A1 Mar. 22, 2012

(51) Int. Cl.
*G06F 19/00* (2011.01)

(52) U.S. Cl.
USPC ........... 700/245; 700/247; 700/248; 700/249; 700/251; 700/255; 901/6; 318/568.11; 318/568.2

(58) Field of Classification Search
USPC ......... 700/245, 247, 248, 249, 251, 255, 257; 901/6; 318/568.11, 568.12, 568.13, 318/568.2, 568.25
See application file for complete search history.

(56) References Cited

U.S. PATENT DOCUMENTS

| | | | |
|---|---|---|---|
| 4,954,948 A * | 9/1990 | Hira et al. ................ | 718/107 |
| 6,330,493 B1 * | 12/2001 | Takahashi et al. ........... | 700/245 |
| 6,434,448 B1 * | 8/2002 | Kosaka et al. ............. | 700/245 |
| 6,556,891 B2 * | 4/2003 | Hietmann et al. .......... | 700/245 |
| 6,804,580 B1 * | 10/2004 | Stoddard et al. ........... | 700/248 |
| 7,072,740 B2 | 7/2006 | Iribe et al. | |
| 7,099,747 B2 | 8/2006 | Mikami et al. | |
| 7,383,100 B2 * | 6/2008 | Ng-Thow-Hing et al. ... | 700/245 |
| 7,881,824 B2 | 2/2011 | Nagasaka et al. | |
| 7,957,838 B2 * | 6/2011 | Poljen et al. ............... | 700/264 |
| 2005/0004707 A1 * | 1/2005 | Kazi et al. ................ | 700/245 |
| 2005/0132121 A1 * | 6/2005 | Robinson ................. | 711/100 |
| 2005/0143840 A1 * | 6/2005 | Matsukura et al. ......... | 700/9 |
| 2007/0168082 A1 * | 7/2007 | Kim et al. ................ | 700/245 |
| 2008/0147206 A1 * | 6/2008 | Zahrai et al. .............. | 700/19 |
| 2009/0018696 A1 * | 1/2009 | Goerick et al. ............ | 700/245 |
| 2010/0094459 A1 * | 4/2010 | Cho et al. ................. | 700/248 |
| 2010/0280661 A1 * | 11/2010 | Abdallah et al. ........... | 700/260 |
| 2010/0280663 A1 * | 11/2010 | Abdallah et al. ........... | 700/264 |
| 2010/0312388 A1 * | 12/2010 | Jang et al. ................. | 700/248 |

FOREIGN PATENT DOCUMENTS

| | | | |
|---|---|---|---|
| JP | 2000267707 A | 9/2000 | |
| JP | 2002120174 A | 4/2002 | |

(Continued)

OTHER PUBLICATIONS http://robotics.nasa.gov/courses/fall2002/event/oct1/NASA_Robotics_20021001.htm.

*Primary Examiner* — Khoi Tran
*Assistant Examiner* — Jaime Figueroa
(74) *Attorney, Agent, or Firm* — Quinn Law Group, PLLC

(57) ABSTRACT

A robotic system includes a controller and one or more robots each having a plurality of robotic joints. Each of the robotic joints is independently controllable to thereby execute a cooperative work task having at least one task execution fork, leading to multiple independent subtasks. The controller coordinates motion of the robot(s) during execution of the cooperative work task. The controller groups the robotic joints into task-specific robotic subsystems, and synchronizes motion of different subsystems during execution of the various subtasks of the cooperative work task. A method for executing the cooperative work task using the robotic system includes automatically grouping the robotic joints into task-specific subsystems, and assigning subtasks of the cooperative work task to the subsystems upon reaching a task execution fork. The method further includes coordinating execution of the subtasks after reaching the task execution fork.

20 Claims, 1 Drawing Sheet

(56) References Cited

FOREIGN PATENT DOCUMENTS

| JP | 2003291083 A | 10/2003 |
| JP | 2004114285 A | 4/2004 |
| JP | 2004195554 A | 7/2004 |
| JP | 2004283960 A | 10/2004 |
| JP | 2005313303 A | 11/2005 |
| JP | 2008515316 A | 5/2008 |
| JP | 2008307662 A | 12/2008 |

* cited by examiner

CONCURRENT PATH PLANNING WITH ONE OR MORE HUMANOID ROBOTS

STATEMENT REGARDING FEDERALLY SPONSORED RESEARCH OR DEVELOPMENT

This invention was made with government support under NASA Space Act Agreement number SAA-AT-07-003. The invention described herein may be manufactured and used by or for the U.S. Government for U.S. Government (i.e., non-commercial) purposes without the payment of royalties thereon or therefor.

TECHNICAL FIELD

The present invention relates to the automatic motion control of multiple robotic joints of one or more humanoid or other dexterous robots within a robotic system.

BACKGROUND

Robots are automated devices which are able to grasp and manipulate objects using end-effectors or robotic manipulators. The robotic manipulators are interconnected by one or more actuator-driven joints. Each joint of a typical robot represents at least one independent control variable, i.e., a degree of freedom (DOF). A typical multi-axis industrial robot has 6 DOF. Control of one such robot is considered routine. However, interference zones may be present in the overlapping motion paths of two or more robots. The presence of such interference zones can complicate the control problem.

When multiple robots are used within a shared workspace, a single controller may be used to automatically coordinate the motion of the robots using a serial handshaking protocol. As understood in the art, serial handshaking dynamically sets the required parameters of any communications channel or link to be established between two robots or other networked devices before communication over the channel can properly commence. A serial handshaking protocol can lose its effectiveness as the number of DOF in the robotic system increases.

SUMMARY

Accordingly, a robotic system and a control method for the same are disclosed herein. The method may be embodied as an algorithm, which can be executed by a controller adapted to coordinate motion of one or more high degree of freedom (DOF) robots. The term "high DOF" as used herein refers to a robot having more than the conventional 6 DOF, and as many as 42 DOF or more in one embodiment, whether the DOF are considered with respect to one robot or to multiple robots used in the same robotic system to cooperatively execute a work task.

A high DOF robot is embodied herein as a dexterous humanoid having at least 42 DOF. Such a robot can be beneficially employed in certain emerging aerospace and industrial applications requiring human-like levels of dexterity. High DOF levels require asynchronous and coordinated joint motion, automated task branching, and independent execution of tasks by the various manipulators of the robot(s) used in the robotic system. This capability is provided by the robotic system and control method disclosed herein.

In particular, a robotic system is operable for executing a cooperative work task having multiple independent subtasks. As used herein, "cooperative work task" refers to a work task executed by more than one robotic joint, and in some instances by multiple joints of more than one robot used within the robotic system. The robotic system includes a robot and a controller. The robot has multiple robotic joints, with each joint being independently controllable during execution of the cooperative work task.

The controller controls motion of the robotic joints during execution of the cooperative work task, doing so by automatically grouping the different joints of the robotic system into task-specific subsystems. The controller then assigns the multiple independent subtasks to the various grouped subsystems upon reaching a task execution fork, and coordinates execution of the subtasks by the respective subsystems after reaching the task execution fork. Multiple task forks may be present, each leading to multiple independent subtasks.

The robotic system in one embodiment has at least 42 degrees of freedom. One or more additional robots may cooperate in executing the cooperative work task. A runtime engine may be used to automatically branch the subtasks. A graphical program editor may be included for accessing the controller, with the program editor allowing a user to configure a branching sequence for the automated branching of the various subtasks. The graphical program editor and programming language of the controller may issue commands to one or more robots and/or robotic systems.

The runtime engine may include an asynchronous execution management (AEM) module which arbitrarily groups the robotic joints into the task-specific subsystems. The AEM module coordinates an asynchronous motion of the robotic joints in executing the cooperative work task. A scheduling module and a database system providing system data and shared event information may also be included in the robotic system, with the scheduling module allowing the multiple independent tasks to be completed independently with respect to each other while at the same time being synchronized using system data and shared events provided from the database system.

A method is also disclosed for executing a cooperative work task having multiple independent subtasks. The method includes automatically grouping the robotic joints into task-specific subsystems, assigning the multiple independent subtasks of the cooperative work task to the task-specific subsystems upon reaching a task execution fork, and coordinating the independent execution of the multiple independent subtasks by the respective task-specific subsystems after reaching the task execution fork.

The above features and advantages and other features and advantages of the present invention are readily apparent from the following detailed description of the best modes for carrying out the invention when taken in connection with the accompanying drawings.

DESCRIPTION

Figure 1:
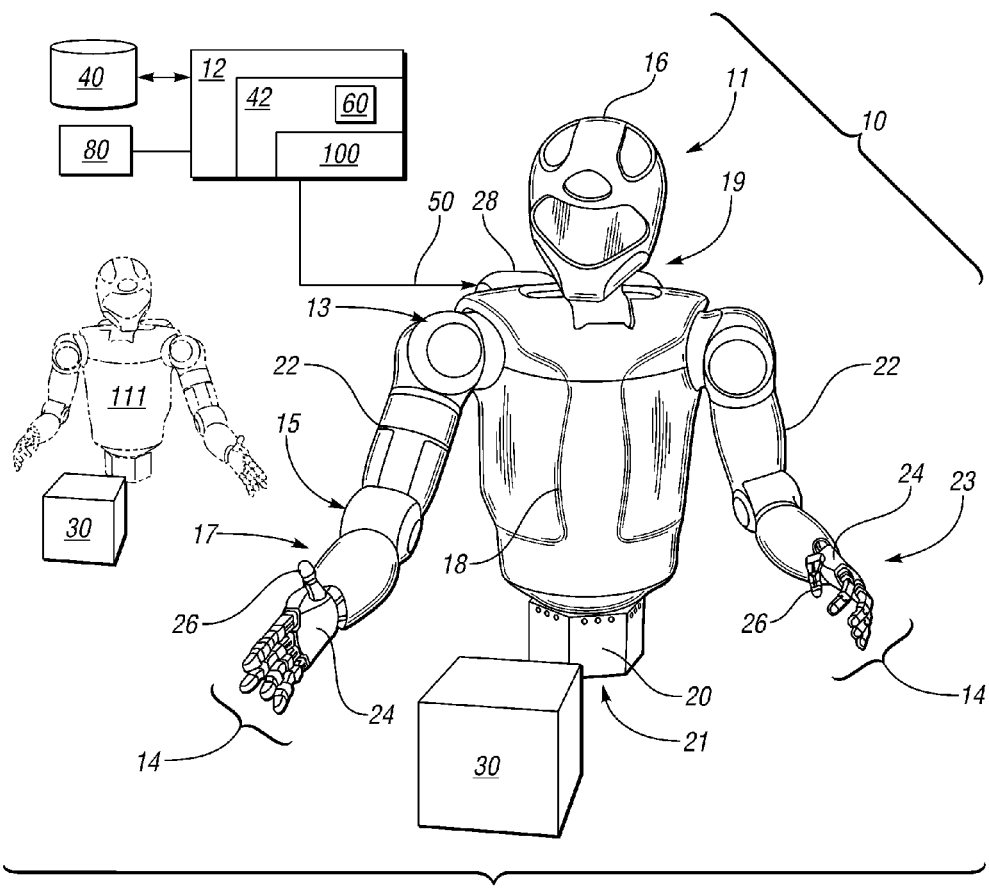
FIG. 1 is a schematic illustration of a robotic system having a high degree of freedom robot with multiple robotic joints, and a controller providing asynchronous and coordinated motion control over the various joints of the robotic system.

With reference to the drawings, wherein like reference numbers refer to the same or similar components throughout the several views, and beginning with FIG. 1, a robotic system 10 is shown having a dexterous robot 11 having a plurality of robotic joints, each of which is described below. The asynchronous, coordinated control of the various joints of the robot 11 is provided by an algorithm 100, which is described in detail below with reference to FIG. 3.

Robot 11 may be configured with human-like appearance as shown, and with human-like levels of dexterity to the extent necessary for completing a given work task. Humanoids and other dexterous robots can be used where a direct interaction is required with devices or systems specifically designed for human use, i.e., devices requiring human-like levels of dexterity to properly manipulate an object 30. The use of a humanoid such as robot 11 may be preferred where a direct interaction is required between the robot and human operators, as motion can be programmed to approximate human motion.

Robot 11 operates via a force- or impedance-based control framework. As used herein, the terms "force-based" and "impedance-based" refer to the control of a robot relying on respective force or impedance commands and feedback signals in order to move and apply forces through the various robotic joints and manipulators of the robot. Robot 11 is controlled using a controller 12, which executes an algorithm 100 to thereby transmit a set of control signals 50 to the robot. Control signals 50 provide asynchronous and coordinated joint motion control of the robot 11 as set forth in detail below.

Control signals 50 may also include a set of force- or impedance-based operating commands and position/force feedback. That is, a user of the robot 11 may specify a desired stiffness, damping, and inertial properties with respect to a mass being acted upon, e.g., the object 30, thereby providing robustness to a physical interaction between the robot and its surrounding environment, and provides flexibility for diverse manipulation tasks.

Robot 11 may be adapted to perform automated tasks with multiple degrees of freedom (DOF), and to perform other interactive tasks or control other integrated system components, e.g., clamping, lighting, relays, etc. According to one possible embodiment, the robot 11 may have a plurality of independently- and interdependently-moveable actuator-driven robotic joints, at some of which have overlapping ranges of motion. Robotic joints may include a shoulder joint, the position of which is generally indicated in FIG. 1 by arrow 13, an elbow joint (arrow 15), a wrist joint (arrow 17), a neck joint (arrow 19), and a waist joint (arrow 21), as well as the various finger joints (arrow 23) positioned between the phalanges of each robotic finger 14.

Still referring to FIG. 1, each robotic joint may have one or more DOF. For example, certain compliant joints such as the shoulder joint (arrow 13) and the elbow joint (arrow 15) may have at least two DOF in the form of pitch and roll. Likewise, the neck joint (arrow 19) may have at least three DOF, while the waist and wrist (arrows 21 and 17, respectively) may have one or more DOF. Depending on task complexity, the robot 11 may move with over 42 DOF. Each robotic joint contains and is internally driven by one or more actuators, e.g., joint motors, linear actuators, rotary actuators, and the like.

Robot 11 may include human-like components such as a head 16, torso 18, waist 20, arms 22, hands 24, fingers 14, and opposable thumbs 26, with the various joints noted above being disposed within or between these components. As with a human, both arms 22 and other components may have ranges of motion that overlap to some extent. Robot 11 may also include a task-suitable fixture or base (not shown) such as legs, treads, or another moveable or fixed base depending on the particular application or intended use of the robot. A power supply 28 may be integrally mounted to the robot 11, e.g., a rechargeable battery pack carried or worn on the back of the torso 18 or another suitable energy supply, or which may be attached remotely through a tethering cable, to provide sufficient electrical energy to the various joints for movement of the same.

Controller 12 provides precise motion control of the robot 11, including control over the fine and gross movements needed for manipulating object 30, e.g., a work tool, which may be grasped by the fingers 14 and thumb 26 of one or more hands 24. The controller 12 is able to independently control each robotic joint and other integrated system components in isolation from the other joints and system components, as well as to interdependently control a number of the joints to fully coordinate the actions of the multiple joints in performing a relatively complex work task.

Robotic system 10 may include at least one additional similarly configured robot 111, shown in phantom in FIG. 1, which operates in the same workspace as robot 11. Robots 11, 111 may be required to execute a task, such as cooperatively grasping and movement of object 30 as illustrated in phantom in FIG. 1. Certain joints of robots 11, 111 can have ranges of motion which overlap to some extent with each other, as well as with ranges of motion of other joints of the same robot. Therefore, each robot used within the robotic system 10 must be able to perform multiple actions asynchronously and in a coordinated manner. This functionality is provided by algorithm 100 and the configuration of a runtime engine 42 described below with reference to FIG. 2.

Controller 12 may be embodied as a server or a host machine having one or multiple digital computers or data processing devices, each having one or more microprocessors or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, and any required input/output (I/O) circuitry and devices, as well as signal conditioning and buffering electronics.

Individual control algorithms resident in the controller 12 or readily accessible by the controller may be stored in ROM or other suitable memory and automatically executed to provide the respective control functionality. A graphical program editor 80 or other suitable user interface may be used to access the programming language of controller 12, as well as configure a branching sequence for coordinated asynchronous task completion as explained below.

Robotic system 10 may include a database system 40 in communication with the robot 11 and/or 111 via the controller 12. Database system 40 may be embodied as a single large database or as a distributed database providing sufficient levels of data storage for the programming language, shared event information, and various communication protocols needed for task execution, as well as the required completion conditions for such tasks. Database system 40 is in communication with the runtime engine 42, which uses an asynchronous execution management (AEM) module 60 to coordinate the asynchronous motion of the various joints within the robotic system 10 when the joints are designated and activated for execution of a present cooperative work task.

Figure 2:
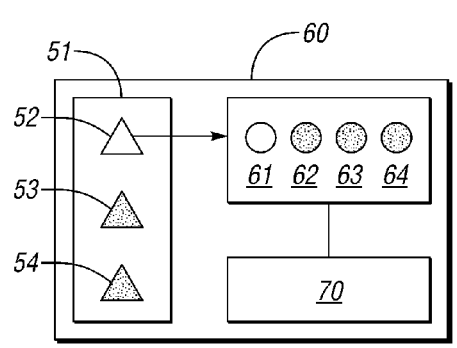
FIG. 2 is a block diagram for a runtime engine which is usable with the robotic system shown in FIG. 1.

Referring to FIG. 2, controller 12 of FIG. 1 uses the AEM module 60 of the runtime engine 42 to arbitrarily group the various joints of the robotic system 10 into task-specific subsystems. For example, the neck joint 19 and joints of both arms 22 might be activated for a particular maneuver wherein the robot 11 turns to the right, looks down at the object 30, and grasps the object in both hands 24. These task-specific subsystems are in turn tied into a calibrated sequencing architecture via the AEM module 60, which automatically coordinates the motion of any active joints, and thus enables the completion of complex or cooperative work tasks. Runtime engine 42 may also be configured to provide a software mechanism for coexistent execution paths inside a larger robotic task sequence.

FIG. 2 provides an example of a simplified series of an independent subtask 51 having multiple task execution forks 52, 53, and 54. Fork 52 is presently active, a state which is indicated in FIG. 2 by an absence of shading. Likewise, forks 53 and 54 are shaded to indicate their execution takes place at some point in the future. Each fork may have multiple independent subtasks, e.g., fork 52 with its multiple independent subtasks 61, 62, 63, and 64. Each subtask may be cooperatively executed, i.e., executed by different joints of the same robot and/or by joints of multiple different robots within the robotic system 10.

AEM module 60 may also include a scheduling module 70 which allows the multiple independent subtasks 61, 62, 63, and 64 to be completed independently of each other, while at the same time synchronizing the tasks through system data and shared events, e.g., data and events accessed via the database system 40 shown in FIG. 1. A branching mechanism for use by the runtime engine 42 is seamlessly integrated into the programming language of the controller 12 (see FIG. 1), and may be configurable by a user through the graphical program editor 80.

Multiple task execution forks can be controlled by the AEM module 60 within the runtime engine 42. Scheduling module 70 in one embodiment can enforce shared execution time for the various tasks, e.g., by using a round-robin scheduling scheme. Each task execution fork maintains its own state and feedback data, and is therefore capable of independent execution by controller 12. Additionally, each task fork may be paused and resumed at any time by controller 12 using the runtime engine 42 without interfering with execution of any of the other forks. Each fork maintains access to the database system 40 and all required programming and shared event information, and can freely interact with data and events from the other forks and robotic hardware.

Figure 3:
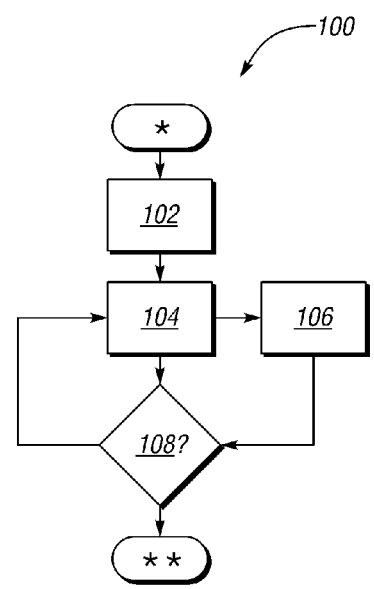
FIG. 3 is a flow chart describing a method for controlling the robot shown in FIG. 1 using the runtime engine shown in FIG. 2.

Referring to FIG. 3, algorithm 100 is executable by the controller 12 of FIG. 1 to provide the asynchronous control of the various joints of the robotic system 10 shown in that Figure. Algorithm 100 begins with step 102, wherein required control nodes for a given cooperative work task are set within the controller 12. For example, nodes may be selected by a user via the graphical programming editor 80, e.g., by touch-screen entry of affected nodes for a given work tool to be used in completing an assigned task. For illustrative clarity, a relatively simple work task is described herein which requires execution of a sequence of commands or task subprograms suitable for moving both arms 22 of the robot 11 shown in FIG. 1 to grab object 30.

After the nodes are set, step 104 initiates execution of a subtask, e.g., movement of one arm 22. As the subtask initiated by step 104 independently progresses through its own task sequence, the algorithm 100 proceeds to step 106. Step 106 initiates execution of another subtask, such as moving the other arm 22 of robot 11 in FIG. 1 or a component of the same or another robot. As with step 104, step 106 may have any number of task steps which must be independently executed by the arm 22 being controlled in step 106. A task execution fork is present between steps 104 and 106. That is, execution of step 104 is not complete when step 106 commences, but rather both steps 104 and 106 are independently executed in an asynchronous manner by the controller 12 as determined by runtime engine 42 of FIG. 1.

At step 108, controller 12 uses runtime engine 42 to determine whether the subtasks of steps 104 and 106 are complete. If not, step 104 and/or step 106 is repeated until the tasks of steps 104 and 106 are both completed. The algorithm 100 is finished when both subtasks are completed. Each subtask may consist of multiple subtasks, and so forth, with one subtask being explained herein for simplicity.

Only one task execution fork is described with respect to FIG. 3 for illustrative clarity. However, runtime engine 42 of FIG. 1 can assign and coordinate as many forks as are required to complete a given cooperative work task or sequence of such tasks. That is, robot(s) 11, 111 of FIG. 1 are designed to asynchronously perform multiple concurrent tasks in a manner similar to that of a human. Runtime engine 42 manages this control requirement in conjunction with or as part of the controller 12 by managing multiple concurrently-executing tasks. Runtime engine 42 provides a mechanism for task execution to be forked at any given point, e.g., initiating step 106 a calibrated interval after commencement of step 104 in the simplified embodiment of FIG. 3, thus creating independent execution paths which can be assigned to any number of computational nodes.

Runtime engine 42 of FIG. 1 also allows for the separated forks to be smoothly reunited before continuing along a shared execution path, e.g., at step 108 of FIG. 3. Control nodes of the same or different robots 11 and/or 111 can be grouped together to form a subsystem such as one or more arms 22 or heads 16, which can then be independently commanded and controlled with respect to each other. Additionally, the use of runtime engine 42 in the manner explained above provides a means for resource conflict resolution between the various forks. In other words, a head subsystem of robot 11 could be paired with a right arm subsystem of robot 111, with this functionality being embedded in the programming language of the controller 12 and readily accessible to a user using the graphical program editor 80 shown in FIG. 1 or using another suitable user interface.

While the best modes for carrying out the invention have been described in detail, those familiar with the art to which this invention relates will recognize various alternative designs and embodiments for practicing the invention within the scope of the appended claims.

The invention claimed is:

1. A robotic system for executing a cooperative work task having multiple independent tasks, comprising:
   a plurality of robotic joints, wherein each of the robotic joints is independently controllable during execution of the cooperative work task; and
   a controller in communication with the robotic joints which controls the motion of the robotic joints during the execution of the cooperative work task;
   wherein the controller is configured to:
      identify the robotic joints to be used in execution of the cooperative work task;
      automatically group the identified robotic joints for the cooperative work task into task-specific subsystems, wherein each task-specific subsystem performs at least one of the multiple independent tasks;
      assign the multiple independent tasks to the task-specific subsystems;
      create multiple task execution forks for each of the multiple independent subtasks, wherein each of the multiple task execution forks includes a set of multiple independent subtasks cooperatively executed by the identified robotic joints, and also maintains its own state and feedback data to thereby enable its independent execution relative to the other multiple task execution forks; and coordinate the independent execution of the fic multiple independent tasks by the respective task-specific subsystems via the multiple task execution forks.

2. The robotic system of claim 1, wherein the controller includes a runtime engine adapted for coordinating motion with respect to the robotic joints of the task-specific robotic subsystems during execution of the cooperative work task.

3. The robotic system of claim 1, wherein the robotic system has at least 42 degrees of freedom.

4. The robotic system of claim 1, further comprising multiple robots, wherein the plurality of robotic joints are distributed between the multiple robots, and wherein the multiple robots cooperate to thereby execute the cooperative work task.

5. The robotic system of claim 1, further comprising a graphical program editor for accessing the controller, wherein the graphical program editor provides an interface for a user to configure a branching sequence for the multiple independent subtasks.

6. The robotic system of claim 2, wherein the runtime engine includes an asynchronous execution management module which arbitrarily groups the robotic joints into the task-specific robotic subsystems, and which coordinates an asynchronous motion of the robot via the robotic joints during the execution of the cooperative work task.

7. The robotic system of claim 1, wherein at least some of the multiple independent work tasks are separately executable by different ones of the robotic joints.

8. The robotic system of claim 7, further comprising multiple robots, wherein at least some of the multiple independent tasks are executable by different ones of the multiple robots.

9. The robotic system of claim 7, further comprising:
a scheduling module; and
a database system;
wherein the scheduling module completes a given one of the multiple independent tasks independently of the other multiple independent tasks, and synchronizes execution of the multiple independent tasks using system data and shared event information from the database system.

10. The robotic system of claim 9, wherein the scheduling module enforces shared execution time for the multiple independent tasks using a round-robin scheduling scheme.

11. The robotic system of claim 1, wherein the controller is operable for automatically pausing and resuming one of the multiple independent subtasks without interfering with execution of the other multiple independent subtasks.

12. A method for executing a cooperative work task having multiple independent tasks using a robotic system having multiple independently controllable robotic joints, the method comprising:

identifying the robotic joints to be used in execution of the cooperative work task;

automatically grouping the identified robotic joints into task-specific subsystems wherein each task-specific subsystem performs at least one of the multiple independent tasks;

assigning the multiple independent subtasks to the task-specific subsystems;

creating multiple task execution forks for each of the multiple independent subtasks, wherein each of the multiple task execution forks includes a set of multiple independent subtasks cooperatively executed by the identified robotic joints, and also maintains its own state and feedback data to thereby enable its independent execution relative to the other multiple task execution forks; and coordinating the independent execution of the multiple independent tasks by the respective task-specific subsystems via the task execution forks.

13. The method of claim 12, wherein the robotic system has at least 42 degrees of freedom.

14. The method of claim 12, wherein the robotic joints are distributed between a plurality of different robots which together execute the cooperative work task, and wherein automatically grouping the robotic joints includes grouping robotic joints from each of the multiple robots.

15. The method of claim 12, further comprising:
using a runtime engine to automatically branch the multiple independent subtasks of the cooperative work task at the task execution fork.

16. The method of claim 15, wherein the robotic system includes a graphical program editor, the method further comprising:
configuring a branching sequence in the runtime engine using the graphical program editor.

17. The method of claim 12, wherein the robotic system includes a scheduling module and a database system providing system data and shared event information, and wherein coordinating the independent execution of the multiple independent subtasks includes using the scheduling module to synchronize and complete the multiple independent subtasks tasks independently with respect to each other using the system data and shared event information.

18. The method of claim 17, further comprising:
enforcing shared execution time for the multiple independent subtasks via the scheduling module using a round-robin scheduling scheme.

19. The robotic system of claim 1, further comprising a single robot having all of the plurality of joints.

20. The method of claim 12, wherein the robotic system includes a single robot having all of the multiple independently controllable robotic joints.

* * * * *